United States Patent [19]

Nostwick

[11] Patent Number: 5,063,331
[45] Date of Patent: Nov. 5, 1991

[54] HIGH FREQUENCY OSCILLATOR-INVERTER CIRCUIT FOR DISCHARGE LAMPS

[75] Inventor: Allan A. Nostwick, Des Plaines, Ill.

[73] Assignee: North American Philips Corporation, New York, N.Y.

[21] Appl. No.: 638,257

[22] Filed: Jan. 4, 1991

[51] Int. Cl.⁵ .......................................... H05B 41/36
[52] U.S. Cl. ............................. 315/219; 315/209 R; 315/307; 315/DIG. 7
[58] Field of Search .................... 315/209 R, 219, 223, 315/255, 283, 307, 200 R, DIG. 2, DIG. 7, 221, DIG. 5, 224

[56] References Cited

U.S. PATENT DOCUMENTS

| | | | |
|---|---|---|---|
| 3,969,652 | 7/1976 | Herzog | 315/224 |
| 4,109,307 | 8/1978 | Knoll | 363/101 |
| 4,484,108 | 11/1984 | Stupp et al. | 315/219 |
| 4,503,361 | 3/1985 | Hanlet | 315/221 |
| 4,513,226 | 4/1985 | Josephson | 315/219 |
| 4,560,908 | 12/1985 | Stupp et al. | 315/219 |
| 4,782,268 | 11/1988 | Fabnrich et al. | 315/200 |
| 5,001,400 | 3/1991 | Nilssen | 315/209 R |

FOREIGN PATENT DOCUMENTS 2115627 9/1983 United Kingdom .

OTHER PUBLICATIONS

R. P. Severns & G. E. Bloom, Modern DC-to-DC Switchmode Power Converter Circuit, 1984, pp. 52–55 and pp. 120–121.

Primary Examiner—Eugene R. LaRoche
Assistant Examiner—Ali Neyzari
Attorney, Agent, or Firm—William Squire

[57] ABSTRACT

A rectifier bridge includes two pairs of diodes, each pair connected to opposing ends of the secondary winding of a boost transformer whose primary winding is in series with the secondary winding of a high frequency DC/AC inverter circuit output transformer which is connected to ballasting capacitors in a fluorescent lamp receiving circuit. The bridge output charges a smoothing DC supply capacitor whose voltage is boosted by a pair of capacitors charged by the boost transformer whose inductance determines that the zero portion of the incoming line current waveform is boosted. The line voltage peaks are uncorrected. In a second embodiment both the peak region and the zero crossing region of the incoming line current waveform are corrected by deriving a portion of the boost voltage from the load circuit and a portion from the inverter circuit.

18 Claims, 3 Drawing Sheets

HIGH FREQUENCY OSCILLATOR-INVERTER CIRCUIT FOR DISCHARGE LAMPS

BACKGROUND OF THE INVENTION

1. Field of the Invention

This invention relates to a circuit for converting low frequency AC power from a power grid to high frequency power for starting and operating low pressure gas discharge lamps, e.g., fluorescent lamps.

2. Description of the Prior Art

U.S. Pat. Nos. 4,560,908 ('908) and 4,782,268 ('268) disclose high frequency circuits for starting and operating gas discharge lamps. These are a few of numerous circuits available in the prior art for this function. Such prior art is further described, by way of example, in these patents. The problem addressed is to improve the efficiency of such discharge lamp starting and operating circuits by reducing the harmonic content of the load signal as seen by the power grid. Early prior art circuits use relatively large ballast transformers which exhibit low efficiency. In addition, they introduce distorted signals into the grid power system, namely harmonics of the grid signal frequency. More recently, improved efficiency has been obtained by operating the ballast circuits at a much higher frequency than that of the power grid; for example, typical power grids supply 120 VAC at 60 KHz whereas more recent circuits, such as disclosed in the aforementioned patents, operate generally in the range of about 15 KHz to 50 KHz. These circuits also tend to introduce harmonics, but to a reduced extent than prior circuits.

A purpose of these circuits is to reduce line current harmonic distortion and provide optimum power coupling to the power source. The '908 patent discloses that harmonic distortion above 40% is unacceptable. However, utilities supplying power are now considering implementing rules where harmonic distortion above 20% is unacceptable, especially in the heavily urbanized Northeast United States. Harmonic distortion produced by such a circuit is introduced into the power grid, corrupts the incoming power signal and reduces the efficiency of the power grid accordingly.

In view of the present costliness of supplying electrical power and the inherent environmental problems of constructing new facilities to meet demand, pressure is now on the utilities to improve efficiency. To do so, utilities may mandate improved efficiency of the load circuits driven by the power grid. By way of example, a present standard which the circuit must meet is set by the International Electrotechnical Commission (IEC) in standard 82 which sets forth the permissible harmonic content which may be fed back by a load or user apparatus into a power grid. However, this standard may be changed, at least for part of the United States.

The present invention is directed to a circuit for meeting such a tightened standard by providing reduced harmonic distortion while enabling the circuit to operate with a variety of discharge lamps of differing power requirements. The '268 patent is directed primarily to a circuit which together with the lamp is replaced as a unit while reducing harmonic distortion. The standard to which the '268 patent is directed, however, is present standard 82.

A problem with reducing harmonic distortion in a ballasting circuit is that ideally, minimum harmonic distortion is provided by a circuit current waveform, in a current fed circuit for example, which identically follows the voltage waveform of the power grid signal at the input to the ballast circuit. However, in contrast, the ideal current waveform of a signal for driving a discharge lamp may be a pulsating square wave exhibiting undesirable high harmonic content, and therefore, unacceptable levels of harmonic distortion with regard to the power grid. A high frequency discharge lamp ballast circuit not only must convert a low frequency power grid signal to a much higher frequency, it must compromise two further competing opposing requirements of the power grid and of the discharge high frequency lamp in regard to modulation of the power signal. These opposing requirements necessitate providing a compromise between a modulated and an unmodulated waveform to the lamp, the former being less desirable for the lamp and most desirable for the power grid. The present invention provides a circuit which addresses these conflicting requirements while providing reduced harmonic distortion to meet more stringent requirements.

SUMMARY OF THE INVENTION

The present invention recognizes that a significant amount of harmonic distortion in a high frequency ballasting circuit such as for example, as provided in the circuit of the aforementioned patent '908 patent, occurs at the zero crossing region of the input line voltage waveform. The circuit according to the present invention corrects the current waveform at the input of the circuit from the power source so that the current waveform more closely follows the power source voltage waveform while providing an output current waveform having characteristics sufficient to efficiently operate a gas discharge lamp.

A high frequency oscillator-inverter circuit for starting and operating at least one electric discharge lamp from a low frequency AC signal of a given waveform produced by a power source, the signal periodically crossing through a zero value to positive and negative maximum peak values, according to the present invention comprises rectifier means responsive to the AC signal applied at an input thereto for providing a fluctuating DC voltage at an output thereof.

Means receive the at least one lamp include a frequency dependent impedance element. The impedance of the element varies as a function of frequency in a sense to maintain the flow of lamp current of a received lamp within given limits. A power output transformer has a secondary winding and a primary winding. Circuit means include at least one semiconductor device and impedance means coupled to the transformer primary winding to form a resonant circuit which produce on the secondary winding a high oscillation operating frequency output voltage relative to the frequency of the AC signal in response to a DC voltage applied as an input thereto.

First power supply means include means responsive to the fluctuating voltage for generating a DC voltage from the fluctuating voltage and for applying the generated DC voltage to the circuit means. A second power supply means is coupled to the means for receiving and to the rectifier means and is responsive to a given voltage threshold for applying to the input and to the first power supply means during at least a portion of the AC signal cycle a signal manifesting the voltage of the AC signal smaller than the threshold level near the zero crossing of the AC signal such that the current waveform at the input induced by the inverter circuit approximately follows the AC signal voltage waveform at said input.

DESCRIPTION OF THE PREFERRED EMBODIMENTS

Figure 1:
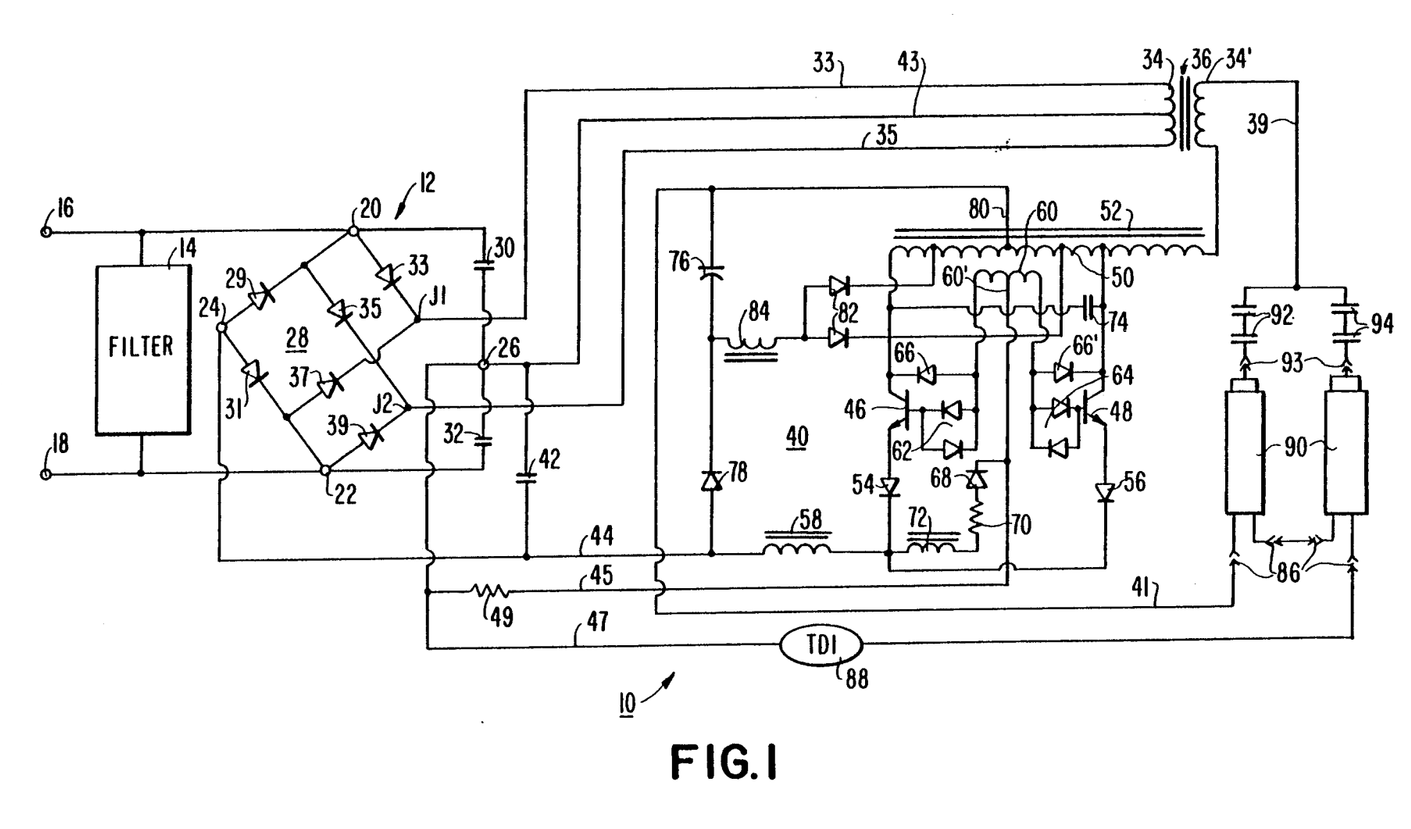
FIG. 1 is a schematic diagram of a circuit according to one embodiment of the present invention.

In FIG. 1, circuit 10 includes a bridge rectifier network 12 and a passive radio frequency interference filter (RFI) 14 connected to and between input terminals 16 and 18. A low frequency AC voltage, for example, 120 volts at 60 Hz, is applied to terminals 16 and 18 from a power grid. Filter 14 may include a common mode choke, a varistor and capacitors to minimize interaction between the power grid and circuit 10 and may comprise, by way of example, the filter described in more detail in the aforementioned U.S. Pat. No. 4,560,908, which is incorporated by reference herein.

Network 12 rectifies the input voltage applied to the network input terminals 20 and 22. Network 12 includes a rectifier bridge 28 having positive output junctions J1 and J2, and negative output junction 24, a first voltage boost output capacitor 30 connected between terminals 20 and 26, a second voltage boost output capacitor 32, preferable substantially the same value as capacitor 30, connected between terminals 22 and 26 and a transformer 36. The secondary winding 34 of transformer 36 is connected between output junctions J1 and J2 of the bridge 28 via respective lines 33 and 35. A fluctuating DC voltage appears between output terminal 24 and terminal 26. Line 43 is connected to the center tap of transformer 36 and to output terminal 26. The respective voltages across capacitors 30 and 32 reduce the harmonic distortion in the current waveform produced by high frequency oscillator-inverter stage 40 at terminals 20 and 22, which stage is similar in some respects in function as the oscillator-inverter stage of U.S. Pat. No. 4,560,908.

Figure 3:
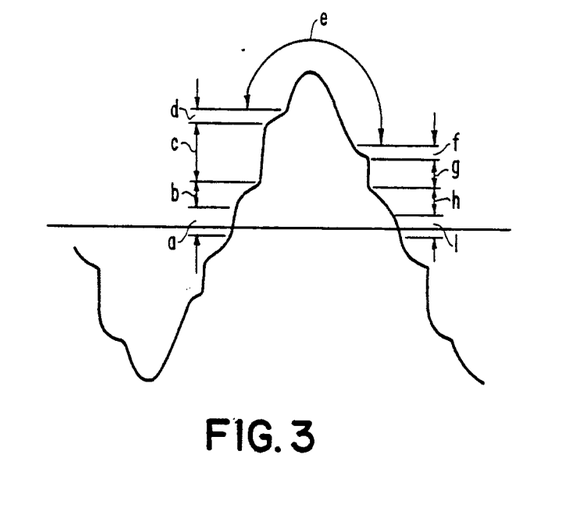
FIG. 3 illustrates a corrected current waveform produced by the circuit of FIG. 1.
Figure 4A:
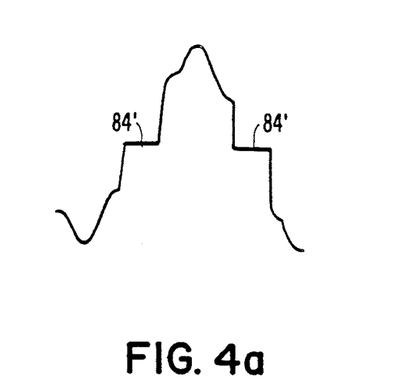
FIGS. 4a–4c respectively illustrate an uncorrected current waveform produced by a portion of the circuit of FIG. 1, the uncorrected current waveform of FIG. 4a superimposed with the corrected current waveform of FIG. 3 and the corrected waveform of FIG. 3 superimposed with the power grid incoming line voltage waveform.
Figure 4B:
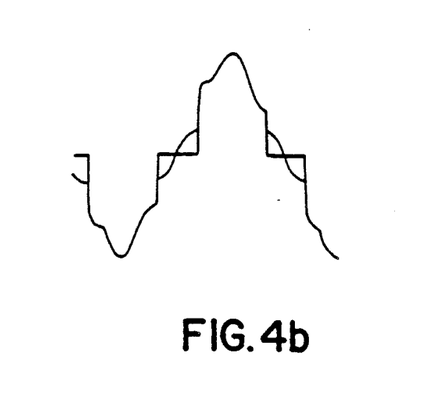
Figure 5:
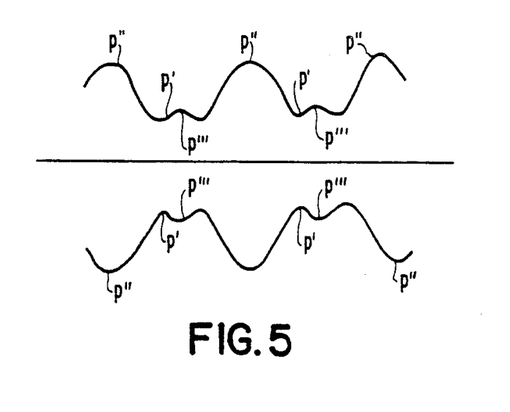
FIG. 5 illustrates the current waveform envelope produced by the circuit of FIG. 1 applied to gas discharge lamps.

The instantaneous current waveform produced by circuit 10 at terminals 20 and 22 is shown in FIG. 3 whereas the modulation envelope of the current waveform applied to the output of stage 40 to lamps 90 is shown in FIG. 5. The uncorrected input line current waveform produced by a circuit similar to circuit 10 without capacitors 30 and 32 and transformer 36 is shown by the waveform of FIG. 4a. This waveform exhibits approximately 30% harmonic distortion. The waveform of FIG. 3 superimposed over the waveform of FIG. 4a as shown in FIG. 4b illustrates a substantial reduction in harmonic content of the FIG. 4a current waveform. These waveforms will be discussed in more detail below. A low value capacitor 42 is coupled between terminals 26 and 24 to provide RFI suppression and additional transient suppression.

Stage 40, a high frequency, e.g., 25 KHz, current fed push-pull resonant oscillator-inverter is connected to the output terminal 24 of network 12 via line 44 and to output terminal 26 via line 41 through lampholder disconnect sockets 86, a thermal protector 88, and line 47. Stage 40 comprises a pair of NPN switching transistors 46 and 48 whose collectors are coupled to opposing ends of the primary, or input, portion of winding 50 of autotransformer 52. The emitters of the transistors 46 and 48 are coupled to line 44 via respective diodes 54 and 56 and through series inductor 58. The base electrodes of transistors 46 and 48 are coupled to respective opposing ends of transformer 52 secondary winding 60 via parallel respective diode pairs 62 and 64, each pair being connected in opposing directions. A diode 66 is connected between the collector of transistor 46 and a point between the junction of the diode pair with the secondary winding 60. A diode 66' is connected similarly between the junction of diode pair 64 and the secondary winding 60.

A center tap 60' of winding 60 is connected to terminal 26 through resistance 49 via line 45 to provide a starting base drive signal for transistors of stage 40. A base electrode drive circuit during steady state operation is provided by series connected diode 68, resistance 70 and inductor 72 connected between center tap 60' and the junction of the cathodes of diodes 54 and 56, and feed choke 58. A capacitor 74 is connected across winding 50 to provide a resonant tuned circuit with winding 50 to fix the frequency of operation if lamps 90 fail to ignite, since capacitors 92 and 94 are disconnected. The switching transistors conduct in mutually exclusive time intervals with each transistor carrying the full DC current when conducting. The transistors carry current at low collector voltage and transition from conducting to non-conducting states also at low voltage. The simultaneous presence of significant current and voltage values is avoided during switching to minimize power dissipation. The collector voltages rise to high values only during the times when the transistors are not conducting.

Inductor 58 is a current feed choke which maintains the current to stage 40 relatively constant throughout each oscillation cycle so that when the transistors 46 and 48 switch, they do so at a fixed current. Inductor 58 includes a core which improves the effectiveness of the inductor. The number of turns of inductor 58 is such to provide the minimum inductance necessary to maintain a relatively constant current. Current ripple magnitude is not critical, the larger the inductance the lower the ripple. The number of windings is a compromise between power loss in the choke and constant current.

An electrolytic capacitor 76 is connected to the cathode of and in series with diode 78 between line 44 and the center tap 80 of transformer 52 winding 50. The center tap 80, and thus capacitor 76 at one capacitor terminal, is connected to output terminal 26 through series connected lamp connectors 86 and thermal overload protector 88. Capacitor 76 on its other side is connected to terminal 24 through diode 78 and line 44. Capacitor 76 stores energy derived from taps on winding 50 and rectified by diodes 82 via inductor 84 to provide current to stage 40 during the zero crossover region of the incoming line voltage at terminals 20 and 22. Capacitor 76 is discharged via diode 78 when the rectified line voltage at terminals 24 and 26 is less than the voltage at the cathode of diode 78.

The cathodes of diodes 82 are connected to respective taps on the primary winding 50 with their anodes connected to the junction between the cathode of diode 78 and capacitor 76 via inductor 84. Inductor 84 includes a core and limits the peak value of current there through to limit the charge applied to capacitor 76 and to reduce the amplitude of the current spikes that otherwise occur. Diodes 82 conduct when the voltage on the winding 50 (peak voltage) is sufficient to charge capacitor 76 as the line voltage at terminals 20 and 22 goes through a cycle and as determined by the number of turns in inductor 84.

The value of inductor 84 has a direct effect on the distortion of the resultant waveform, i.e., the length of the flat portions 84' in FIG. 4a. As the inductance value of inductor 84 is increased, the voltage on capacitor 76 is reduced, with the result that the distortion, i.e., the flat portions 84' of waveform 4a, decrease in duration at terminals 20 and 22. The peak current at the input terminals 20 and 22 also is reduced, as the voltage on capacitor 76 is lowered, and the dead time represented by portions 84' is reduced. With the various circuit values compromised to obtain acceptable operation, capacitor 76 is charged to about 50% of the line voltage peak amplitudes via diodes 82 and inductor 84. However, as the value of inductor 84 is increased, and the voltage charged on capacitor 76 decreased, the voltage on capacitor 76 may decrease to less than a critical level necessary to maintain a minimum satisfactory level of current through the lamps 90, and the lamps will then tend to extinguish during the valleys, which shortens the lamp operating life. Therefore, the limit on the minimum amount of distortion which can be provided by increasing the value of inductor 84 is that which will provide adequate operating minimum or valley current for the lamps 90.

The energy in capacitor 76 drives the stage 40 during the intervals shown in portions p' of FIG. 5. The peaks p'' of the waveform of FIG. 5 represent the line current portion e of the waveform of FIG. 3. As a result, there is modulation of the current applied to the lamps at twice the 60 Hz line frequency, which modulation is not as desirable as an unmodulated signal with regard to optimum lamp operation. A circuit for generating an unmodulated signal will be described below with respect to FIG. 2, however, this circuit is more adapted to operate lamps having a particular set of operating characteristics, and therefore, is not as flexible as the circuit of FIG. 1.

Connectors 86 receive one end of a pair of fluorescent gas discharge lamps 90 connected in what is termed parallel, although they are not literally so. Lamps 90 may be 8 foot long instant start types having a starting voltage of about 500-600 RMS volts. The other ends of lamps 90 are each connected to secondary primary 34' of transformer 36 via respective series connected capacitors 92 and 94 and connectors 93. Capacitors 92 and 94 function as non-dissapative impedances whose impedance serves to maintain the flow of lamp current within desired limits.

Figure 4C:
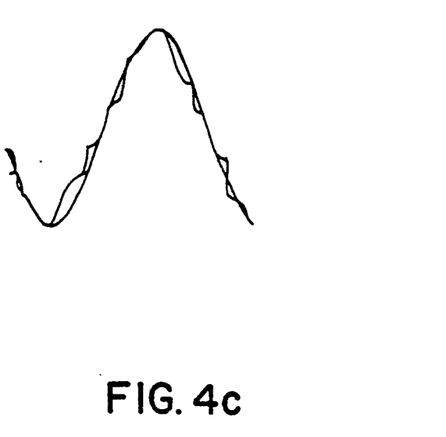

The bridge 28, capacitors 30 and 32 and transformer 36 provide reduced harmonic input current at terminals 20, 22 and 16, 18 as seen by the grid network. These elements correct the current waveform at terminals 20 and 22 at the zero crossing region of the incoming line signal. It is at the zero crossing region where a major portion of distortion represented by portions 84' occurs as seen in FIG. 4a. Comparison of the corrected waveform of FIG. 3 and as superimposed in FIG. 4b with the uncorrected waveform of FIG. 4a illustrates the magnitude of improvement. The waveform of FIG. 3 exhibits about 14% harmonic distortion as illustrated in FIG. 4c in comparison with the incoming line voltage and with about 30% distortion of the waveform of FIG. 4a.

Bridge 28 includes a diode 29 connected between input terminal 20 and negative terminal 24 and diode 31 connected between input terminal 22 and negative terminal 24 to provide a path for the negative portions of the incoming signal. The positive portion of the bridge comprises a first pair of diodes 33 and 35 whose anodes are connected to terminal 20 and whose cathodes are connected to opposing ends of the secondary winding 34 of transformer 36. The second positive portion of the bridge includes a second pair of diodes 37 and 39 whose anodes are connected to terminal 22 and whose cathodes are respectively connected to opposing ends of secondary winding 34 of transformer 36.

During peak portions of the incoming line voltage, where current is also highest, diodes 33-39 conduct sufficiently so that they effectively short out winding 34 of transformer 36 so that there is effectively zero voltage across winding 34. This occurs because of the limited level of current that can be supplied by transformer 36. At this time each of the diode pairs 33,35 and 37,39 act effectively as a single rectifying diode in its respective branch with respect to the signal applied between the input terminals 20 and 22 and the output terminals 24 and 26. During this cycle portion the waveform portions e, FIG. 3, are driving the stage 40 creating the peak portions p'' of FIG. 5. These portions are essentially produced by the line voltage and have a peak value corresponding to that of the line signal. The current from the incoming line signal at terminals 20 and 22 via the bridge, oscillator and load is also applied to capacitors 30 and 32 via transformer 36 winding 34. During portion e of the cycle, the current from the transformer 36 is insufficient to charge capacitors 30 and 32 so that these elements have no effect at this time. Therefore, the maximum voltage charged on the capacitors 30 and 32 is limited by the difference between the voltage on the incoming line and on capacitor 76 only when the input line is low and the DC bus is supported by the capacitor energy and also due to the limited current that can be supplied.

Diodes 33 and 35 rectify the output of transformer 36 generating a fluctuating DC voltage across capacitor 30 and diodes 37 and 39 supply voltage to capacitor 32. Whenever the line terminal 20 voltage is negative, a current is driven through the corresponding diode 29 to the negative DC bus line 44, and when line terminal 22 is negative, a current is driven through diode 31. The positive line current through the corresponding positive bridge diodes pushes the voltage at terminal 26 positive, with the voltage that is supplied by transformer 36 being effectively added to the incoming line voltage. The output terminal 26 at this time becomes effectively a bus for positive DC voltage. The boosting voltage is utilized in alternate half cycles in either capacitor 30 or 32 according to the input line polarity. The voltage on winding 34 is produced by the load current at winding 34' drawing some of the power from the load circuit at this time to add a voltage to the line voltage at the zero crossing region of the line voltage in regions a and b of FIG. 3. The potential including the added voltage appears at terminal 26 which is a boosted DC rail. The boost voltage magnitude depends on the incoming line voltage magnitude and is the difference between the instantaneous value of incoming line voltage and the voltage on capacitor 76, during times when the line voltage is less than the capacitor 76 voltage.

The voltage on capacitor 30 (or 32) is driven down to zero by the incoming line current at the peak line voltage region. The boost voltage is supplied only when the instantaneous voltage of the incoming line is less than approximately ½ of the peak value (regions a,b and h,i, FIG. 3). As the incoming line current increases the boost voltage is driven down to zero. The charges on the capacitors 30 and 32 are voltage limited at the zero crossing region of the incoming line by the voltage difference between the input line and capacitor 76, so that transformer 36 generates a voltage on capacitors 30 and 32 only when the incoming line voltage is low. The output power to the lamps is supported by capacitor 76 at a region close to the zero crossing of the incoming line, portion p' FIG. 5. The current at the input terminals 20 and 22 is low enough so that transformer 36 can deliver an output voltage from the lamp circuit on line 43. The boost circuit maintains input line current while the circuit stage 40 input is at the potential of capacitor 76. The entire circuit runs on the energy of capacitor 76 at this time, that is the net energy is flowing out of capacitor 76. The boost circuit tends to contribute to the voltage produced by capacitor 76, since it does in fact cause the total circuit to continuously absorb energy from the input line even while recirculating energy from capacitor 76 to transformer 36 to capacitors 30 and 32. This action makes the line current flow when it otherwise would not flow because its voltage would be lower than that on capacitor 76. The small peaks p''' in which cancels part of the capacitive impedance of capacitors 92 and 94, and results in a small increase of current during the times when winding 34 is completely unclamped by the load on 34.

The distortion at portions 84' of FIG. 4a occurs when the instantaneous line voltage drops to a level where the load is carried by capacitor 76. In this case there is no current flow from the incoming line when the line voltage is less than the voltage on capacitor 76. Diodes 82 and inductor 84 charge capacitor 76 during the time when the stage 40 runs directly from the peak portion of the line voltage and the line voltage is greater than the capacitor 76 voltage. Capacitor 76 may be, for example, 330 microfarads for a 120 volt line voltage.

Inductor 84 may be 100 microhenrys. It can be set to determine the voltage to which capacitor 76 charges. The voltage on capacitor 76 determines the angle of the incoming line signal at which transfer of energy to and from capacitor 76 occurs. This affects how much distortion is generated. An increase in the voltage increases distortion whereas a decrease in voltage decreases the lamp valley current to a point where it may be too low to maintain the required minimum lamp current. The capacitor 76 voltage is therefore a compromise of these two factors. Inductor 84 may be, for example, 96 turns of #24 wire with a solid core ½ inches long by ⅛ inches. Inductor 58 may comprise an E core for energy storage.

The voltage generated by transformer 36 is determined by the turns ratio of windings 34 to 34'. This transformer acts like a perfect transformer with an inductance in parallel with one of its windings. Transformer 36 has an inductance that has a value that will allow it to carry a load current that is applied to a single winding. That is, with an open circuit relative to capacitors 30 and 32, the transformer 36 limits the amount of voltage that will appear across its windings. The voltage on capacitors 30 and 32 is then limited to the voltage supplied by transformer 36. The open circuit voltage on transformer 36 is limited by its own impedance. Perhaps more importantly, this action determines the shape of the voltage vs. current characteristic of the boost circuit, when taken as a source, as is the case during intervals when the line input voltage is relatively low. The capacitor 76 supports the load at this time and causes the vertical portions a and b in the corrected waveform of FIG. 3. Portions d and f are not caused by the correction effect but represent an overshoot of the waveform which is intrinsic in the inverter circuit. Portion e as previously discussed is the uncorrected line current. The differences in the two waveform curves of FIG. 4c amount to about the 14% distortion mentioned above.

The transformer 36 is coupled to the lamp load circuit in order to derive the boost voltage from the load. It has been observed that to derive a boost voltage directly from the stage 40 can result in a regenerative situation under no load conditions in which the circuit would tend to destroy itself with runaway voltages. However, it is important that in deriving power from the load circuit that the power to drive the lamps is not reduced to a level at which the lamps may be powered below their operating level. In this case the lamps would de-ionize and cut off. The transformer 36 transfer of power, by being limited to the line voltage zero crossing region, derives sufficient power for correcting the distorted signal while maintaining sufficient power in the lamp load circuit to drive the lamps.

Because the boost voltage is shunted to zero just before the peak value of the input AC line voltage is reached, this results in the output DC voltage across capacitor 42 to not rise above that AC voltage incoming line value, and thus, has a well defined value with respect to the incoming line value. This definition of the DC voltage is much desired because the operating power level changes more slowly as a result of incoming line voltage change and the operating voltage applied to the DC-AC converter is not increased above the value normally associated with a simple directly rectified line voltage and therefore, does not increase the stress to be tolerated by the converter. Further, normal operating voltage is obtained more quickly after application of the line voltage because excess energy required is available during the early stage of start up without cathode preheating, in the case of instant starting systems. Further, the boost current is directly proportional to the amount of load current, and so is automatically adjusted to an amount which compensates the input rectifier bridge current for any given load condition, including no load.

For a given load current, the voltage that is developed across the windings of transformer 36 is proportional to the inductance of that transformer winding, under the condition that no other load is applied to the transformer. It is the value of this voltage that determines at what point in the input line voltage cycle that conduction will begin. The conduction of the input rectifier bridge begins whenever the instantaneous magnitude of the input line voltage, plus the value of the boost voltage, are equal to the capacitor 42 voltage. The value of the inductance of the transformer 36 is therefore important in determining the point of the start of conduction to the transformer from the input rectifier. It should be noted that in the particular example of FIG. 3, there is an overcorrection in that boost voltage exceeds capacitor 76 voltage. Such need not be the case in all design applications of the correction principle.

The ratio of the transformer 36 windings is also important in determining the amount of current that is applied to the boost operation. It is at the point of the input line voltage cycle where the load current multiplied by the inverse of the turns ratio, which is to say, the amount of the boost current that is presented to the input rectifier bridge, is just equal to the line rectifier current that would exist at that point in the cycle without boost. The voltage across the transformer at this time is shunted to zero and this determines the maximum value of line rectifier current at which boosting can take place. It is the combination of reflected load current and coupling transformer shunt impedance that is adjusted to obtain the best possible correction of line current waveshape.

In FIG. 3, portion a represents the line current changing direction, e.g., negative to positive. The boost voltages from capacitors 30 and 32 overcompensate at this time. With the lamp load coupled in, the voltage on these capacitors can rise to a slightly greater value than that on capacitor 76. This has the effect of causing the line current to rapidly switch from some value, not zero, in one direction, through the zero crossing of the incoming line signal, to a second non-zero value in the other direction. As the current assumes the value at the top of portion a, it is supported by the boost circuit feeding current into capacitors 30 and 32. During the zero crossing time the capacitors 30 and 32 switch from one to the other as a source of power.

Portion b (and the inverse with portion h) occurs in the time when the voltage on capacitor 30 (or 32) is forced lower in magnitude by the loading effect of the line current. A given voltage-current relation forces the shape of portion b. At the end of portion b adjacent to portion c, the voltage on the boost capacitors is forced to zero when the line current increases to the level of maximum current that the boost circuit can deliver, which is determined by the load current driving transformer 36 and the turns ratio of this transformer. Any more current out of capacitors 30 and 32 causes the voltage therefrom to collapse to zero-a short. At portion g, (the inverse at portion c) the line current is being relieved of load current with the load current being assumed by capacitor 76. At portion h the boost circuit again supports the line current. The boost voltage rises to a point between portions h and i where the line voltage reaches and passes through zero. The inverse occurs during the negative portion of the waveform.

By permitting the peaks of the line voltage to drive the circuit, the crest factor value of the lamp current is not as desirable as if the peaks were also corrected. However, in the interest of flexibility and fewer components the crest factor is not reduced to a more desirable level in the circuit of FIG. 1. The advantage is that this circuit is less effected by line voltage fluctuations and is adaptable to a different variety of lamps, e.g., different operating voltages.

Figure 2:
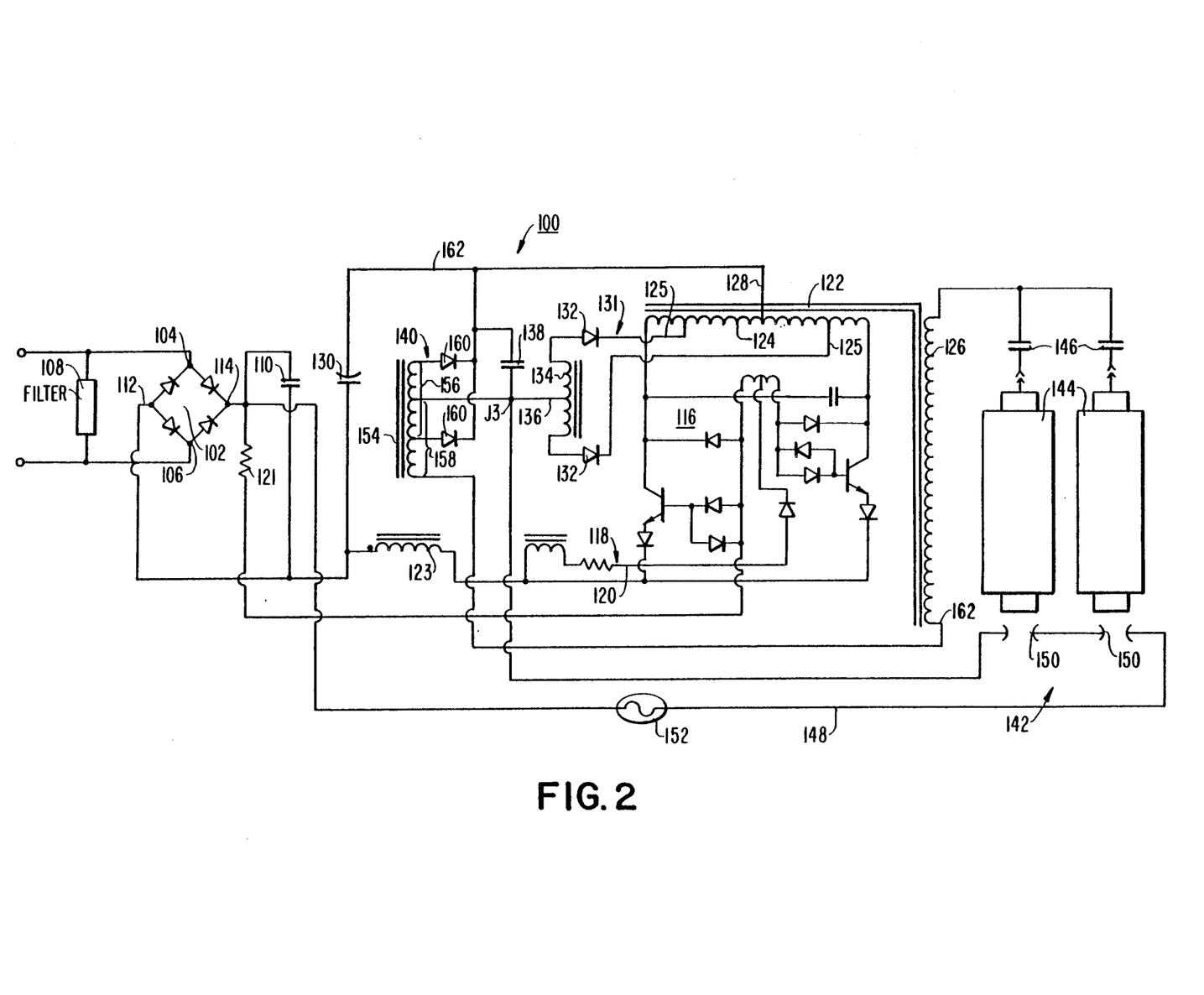
FIG. 2 is a schematic diagram of a circuit according to a second embodiment of the present invention.

In FIG. 2, circuit 100 provides improved harmonic distortion, a reduced crest factor and improved power factor, but is capable of being accurately balanced only for operation with a given lamp voltage. Because lamps of different voltages all draw about the same current due to the ballast circuit acting as a constant current source, lamps of lower voltages absorb less energy from the circuit and may cause this circuit to provide increased undesirable boost voltage. This is in comparison to the circuit 10 of FIG. 1 wherein a portion of the power to the load is derived directly from the line voltage such that a balance of the circuit to a load is not as critical and lamps of differing voltages may used with circuit 10.

Circuit 100 comprises a standard bridge rectifier network 102 having input terminals 104 and 106 for receiving AC line voltage from a grid power source, e.g., 120 volts at 60 Hz. Filter 108, which may be identical to filter 14, FIG. 1, is connected between terminals 104 and 106 across network 102. Filtering capacitor 110 is also connected between terminals 104 and 108 and serves the same high frequency filtering function as capacitor 42 of FIG. 1. The network 102 has output terminals 112 and 114.

Circuit 100 includes an oscillator-inverter stage 116 which may be identical to stage 40 of FIG. 1 performing identical functions for converting the low frequency incoming line signal to a high frequency lamp operating output signal, e.g., 25 KHz. Stage 116 includes a transistor base electrode drive circuit on line 120 for driving the transistor switches in similar fashion as the corresponding transistor drive circuit of FIG. 1. An oscillator starting circuit comprises resistance 121 coupled between output terminal 114 and the base electrode drive circuit of the transistors of stage 116. One end of inductor 123 is coupled to the emitters of stage 116 and an end of circuit 118 and to terminal 112 at the other inductor end and serves as a current limiting feed choke similar to inductor 58 of FIG. 1.

An output transformer 122 has a primary winding 124 and a secondary winding 126. Center tap 128 of winding 124 is connected to output capacitor 138 and to electrolytic capacitor 130 whose voltage drives the stage 116. Capacitor 130 is charged by the pulsating signal produced by the network 102 from the line voltage and by energy from boost voltage capacitor 138 connected in series with capacitor 130 between terminals 112 and 114. Capacitor 138 is charged with a boost voltage generated by branches 131 and 140 which respectively derive their power from transformer 122 and from the lamp load circuit. Branches 131 and 140 each produce current-to-voltage relationships which complement each other and the pulsating signal produced by network 102 to provide a current at the input of the bridge 102 which more closely follows the line voltage waveform. Capacitor 130 becomes the DC supply for the stage 116, which runs the inverter stage at a steady amplitude and may be referred as a ripple filter. The signal to capacitor 130 is normally pulsating at twice the input line frequency. The capacitor 130 holds up the DC level during each period of the pulsation, for operating stage 116. The voltage on capacitor 138 is added to the incoming line voltage at the network 102 output and then applied to capacitor 130.

A first voltage boost branch 131 comprises diode pair 132 whose cathodes are connected to different taps on winding 124 and whose anodes are connected to opposing ends of inductor 134. Center tap 136 of inductor 134 is coupled to center tap 128 through voltage boost output capacitor 138. Inductor 134 and diodes 132 provide a boost charging voltage to capacitor 138 derived from winding 124. Capacitor 138 acts as a source for delivery of energy by the circuit 100. As a source, as the load current increases from capacitor 138, the voltage decreases. Inductor 134 has a relatively low impedance and the taps on winding 124 provide a low open circuit voltage. This combination compensates for the high current peaks at the high voltage portion of the crests of the incoming line waveform. This characteristic only operates effectively over a limited range of load voltages, because as the load voltage changes under constant current conditions the required branch 131 V-I relation also changes.

Branch 131, however, tends to be excessively regenerative in the open circuit lamp load condition. Therefore, to preclude a regenerative voltage runaway condition, the open circuit voltage of branch 131 is kept low, and a second branch 140 which is operated by the load current from load circuit 142 provides the higher open circuit voltage needed to compensate the line current near the line voltage zero crossing time.

Circuit branch 140 includes an autotransformer 154 having a secondary, or output, winding 156, and a primary, or input, winding portion 158. The ends of the secondary winding are connected to the junction of capacitor 138, center tap 128 and capacitor 130 through diodes 160 whose cathodes are connected to that junction. One end of winding 158 is connected to junction J3 and the other end is connected to secondary winding 126 end 162.

Branch 140 has a relatively high open circuit voltage as compared to branch 131. Autotransformer 154 has a relatively high inductive impedance which produces higher voltage at a lower current than inductor 134. This branch provides a V-I relation which fills in the high voltage low current portion of the load curve as seen by capacitor 138. This occurs at that part of the incoming line waveform when the voltage is lower and the current also is low. The V-I relation for branches 131 and 140 thus have different slopes and different open circuit voltages to compensate for different portions of the incoming line waveform.

The open circuit voltage of circuit 100 is a function of the tap points on transformer 122. Inductance 134 has a much lower value than that of transformer 36 of FIG. 1. The peak current may be, for example, several amperes. Branch 140 limits the boost voltage that can occur under no external load since no boost is generated by branch 140 when no load exists. The larger part of the boost energy is obtained from branch 140. The remaining energy is obtained from the voltage source via transformer 122 and circuit 131. This reduces the amount of energy taken from the load circuit to insure the lamps remain operating at all times. Taking too much energy from the load circuit causes the load current to be modulated, causing the crest factor of the load to increase. Some of the energy to boost the operating voltage is taken from the output transformer primary winding to reduce the crest factor. Where the crest factor is critical, the circuit of FIG. 2 is preferred over that of FIG. 1.

Branch 131 also raises slightly the starting open circuit voltage of the load circuit to improve lamp starting employing what is referred to as rapid start ballast. Other lamp configurations known as instant start may also benefit from higher starting voltages. Correct operation of the circuit is obtained empirically by determining the impedance of inductor 134 and the position of the taps on transformer 122 in combination with the determined ratio of the inductance of transformer 154 to the parallel inductance of transformer 154.

The voltage on capacitor 138 boosts the voltage to stage 116 provided by capacitor 130 to provide reduced harmonic distortion, a reduced crest factor and an improved power factor as compared to prior art circuits. In contrast to the modulated output load signal provided by the circuit of FIG. 1, circuit 100 exhibits minimum modulation since the power to drive the stage is derived from capacitors 138 and 130 at a relatively constant voltage in comparison. This provides an improved operating signal for driving the lamps 144 in load circuit 142.

The load circuit comprises lamps 144 connected in what is known as parallel to one end of secondary winding 126 of transformer 122 through respective current limiting capacitors 146 and to line 148. Line 148 includes series connected connectors 150 and thermal overload protector 152 connected between terminal 114 and junction J3 of capacitor 138 and tap 136. Line 162 connected to capacitors 130 and 138, diodes 160 and center tap 128 carries DC positive boosted voltage. The circuit comprising terminal 114, line 148 junction J3, the tap to inductor 134 and connection to winding 158 end carries DC positive unboosted voltage, and also the return lamp current. Terminal 112 to capacitor 130, and inverter stage 116 carries a DC negative voltage.

The circuit 100 maintains the incoming line current flow as the line voltage passes through zero, and avoids the high peak currents that otherwise flow for a relatively short times twice during each input line cycle. Capacitor 130 is charged up to and slightly beyond the peak voltage of the line voltage. The sum of the currents from branches 131 and 140 charges capacitor 138 to a pulsating value peaking at about the voltage level to which capacitor 130 is charge by the rectified line voltage. The boost current is supplied through impedances represented by inductor 134 and transformer 154 which modify the current-voltage relationship delivered to the output of capacitor 138. This relationship is one which makes the instantaneous value of the incoming line current proportional to the instantaneous value of the incoming line voltage. This current is derived from the difference that exists at any given time between the instantaneous value of the line voltage and the DC voltage that exists across the capacitor 130. This difference is in the nature of an inverse relation as that of the line voltage waveform. The outputs of branches 131 and 140 while here summed in parallel, could in a modification of the circuit also be summed in series.

In FIG. 2, transformer 154 and in FIG. 1, transformer 52 are shown as autotransformers. It should be understood that these could also be non-autotransformers such as transformers 126, FIG. 2, and 36 of FIG. 1. Conversely, the transformer 126 may be an autotransformer.

What is claimed is:

1. A high frequency oscillator-inverter circuit for starting and operating at least one electric discharge lamp from a low frequency AC signal of a given waveform produced by a power source, said signal crossing through a zero value to a maximum peak value, said circuit comprising:

rectifier means responsive to said AC signal applied at an input thereto for providing a fluctuating DC voltage at an output thereof;

means for receiving said at least one lamp including a frequency dependent impedance element for maintaining the flow of lamp current of a received lamp within given limits;

a power output transformer having a secondary winding and a primary winding;

circuit means including at least one semiconductor device and impedance means coupled to the transformer primary winding to form a resonant circuit which produces on said secondary winding a high oscillation operating frequency output voltage relative to the frequency of said AC signal in response to a DC voltage applied as an input thereto;

first power supply means including means responsive to said fluctuating voltage for generating a relatively smoother DC voltage from the fluctuating voltage and for applying the generated DC voltage to said circuit means; and second power supply means coupled to said means for receiving and to said rectifier means responsive to a given voltage threshold for applying to said input and to said first power supply means during at least a portion of the AC signal cycle a signal manifesting the voltage of said AC signal smaller than said threshold level near the zero crossing of said AC signal such that the current waveform at said input induced by said circuit means approximately follows the AC signal voltage waveform at said input.

2. The inverter circuit of claim 1 wherein said second power supply means comprises a second transformer having a secondary winding of a given impedance and a primary winding connected in series with said first transformer secondary winding and said means for receiving for carrying a load current, and capacitor means forming an output of said rectifier means and connected between said second transformer secondary winding and said rectifier means input, said second transformer and capacitor means for applying a boost voltage to said rectifier means input adjacent to said AC signal zero crossing.

3. The inverter circuit of claim 2 wherein said circuit includes a pair of input terminals, said rectifier means comprises a rectifier bridge connected between said input terminals, said rectifier means having a pair of output terminals, said bridge comprising a first pair of diodes, each diode of the pair being coupled between a different input terminal and one output terminal, said bridge further comprising second and third pairs of diodes, the second and third pairs being coupled to different input terminals and to the secondary winding of said second transformer, said second transformer having a secondary winding center tap connected to the other output terminal of said rectifier means.

4. The inverter circuit of claim 3 wherein said capacitor means includes a first capacitor connected between one input terminal and said other output terminal and a second capacitor connected between the other input terminal and said other output terminal.

5. The inverter circuit of claim 4 wherein said first and second capacitors have substantially the same value.

6. The inverter circuit of claim 1 wherein said first power supply means comprises a capacitor coupled to an output of said rectifier means through a diode and to a tap on said output transformer primary winding and second rectifying means coupled to said output transformer primary winding and to the junction between said diode and capacitor through a series connected inductor.

7. The inverter circuit of claim 6 wherein said series connected inductor has a value to minimize distortion of said AC signal at said input and to provide a minimum lamp operating current to said means for receiving.

8. The inverter circuit of claim 1 wherein said rectifying means has input and output terminals, said first power supply means comprises a first capacitor coupled between said power output transformer primary winding and an output terminal, said second power supply means comprising a second capacitor coupled in series with the first capacitor and said receiving means, and means for charging said second capacitor with a first distortion correction signal derived from said output transformer primary winding and a second distortion correcting signal derived from current flowing in said output transformer secondary winding.

9. The inverter circuit of claim 8 wherein said means for charging the second capacitor includes a first branch for correcting a first portion of the incoming line signal distortion comprising a choke and second and third rectifying means, the choke being coupled to the junction of the first and second capacitors, a second transformer having a primary and secondary winding, the secondary winding of the second transformer being coupled between the junction of the second capacitor and the receiving means at one winding end and to one end of the secondary winding of the output transformer.

10. The inverter of claim 9 wherein said means for charging said second capacitor includes a second branch comprising a transformer coupled to the primary winding of the output transformer via fourth rectifying means, to the junction of said first and second capacitors and to the secondary winding of the output transformer.

11. A high frequency oscillator-inverter circuit for starting and operating at least one electric discharge lamp from a low frequency AC signal of a given waveform produced by a power source, said signal crossing through a zero value to a maximum peak value, said circuit comprising:

rectifier means responsive to said AC signal applied at an input thereto for providing a fluctuating DC voltage at an output thereof;

means for receiving said at least one lamp including a frequency dependent impedance element for maintaining the flow of lamp current of a received lamp within given limits;

a power output transformer having a secondary winding and a primary winding;

circuit means including at least one semiconductor device and impedance means coupled to the transformer primary winding to form a resonant circuit which produces on said secondary winding a high oscillation operating frequency output voltage relative to the frequency of said AC signal in response to a DC voltage applied as an input thereto;

first power supply means including first capacitor means coupled between said circuit means and said rectifier means responsive to said fluctuating voltage for providing a DC voltage to said circuit means; and second power supply means including second capacitor means and first inductor means coupled to said means for receiving and to said rectifier means for determining said given voltage threshold and for applying to said input and to said circuit means during a portion of the AC signal cycle a signal manifesting at least the voltage of said AC signal smaller than said threshold level near the zero crossing of said AC signal such that the current waveform at said input induced by said circuit means approximately follows the AC signal voltage waveform at said input.

12. The inverter circuit of claim 11 wherein said first capacitor means comprises a first capacitor between an output of said rectifier means and said circuit means, said second capacitor means comprising at least one capacitor connected between an input and output of said rectifying means.

13. The inverter of claim 11 wherein said first capacitor means comprises a first capacitor between an output of said rectifier means and said circuit means, said second capacitor means comprises a second capacitor in series with the first capacitor and said receiving means.

14. The inverter of claim 13 wherein said second capacitor means comprises an inductor coupled to said output transformer primary winding via second rectifying means for providing a current waveform correction signal at said input of a first slope and a second transformer having a primary and a secondary winding, the latter winding connected to said second capacitor at one winding end and to the output transformer secondary winding at a second winding end for providing at said input a correction signal of a second different slope than the first slope.

15. The inverter circuit of claim 11 wherein said rectifying means comprises a first diode pair whose anodes are connected to one terminal of said input and whose cathodes are connected to opposing ends of said inductor, said inductor forming the secondary winding of a transformer whose primary winding is in series with the secondary winding of the output transformer, said rectifying means further comprising a second diode pair whose anodes are connected to a second input terminal of said input and whose cathodes are connected to said opposing ends of said inductor, a tap on said inductor forming an output terminal of said rectifying means.

16. The inverter of claim 15 wherein said second capacitor means includes a first capacitor connected between one input terminal and said output terminal of said rectifying means and a second capacitor of like value as the first capacitor connected between a second input terminal of said rectifying means and said output terminal.

17. A high frequency oscillator-inverter circuit for starting and operating at least one electric discharge lamp from a low frequency AC signal of a given waveform produced by a power source, said signal crossing through a zero value to a maximum peak value, said circuit comprising:

rectifier means responsive to said AC signal applied at an input thereto for providing a fluctuating DC voltage at an output thereof;

means for receiving said at least one lamp including a frequency dependent impedance element for maintaining the flow of lamp current of a received lamp within given limits;

a power output transformer having a secondary winding and a primary winding;

circuit means including at least one semiconductor device and impedance means coupled to the transformer primary winding to form a resonant circuit which produces on said secondary winding a high oscillation operating frequency output voltage relative to the frequency of said AC signal in response to a DC voltage applied as an input thereto;

capacitor means coupled to said rectifier means and to said circuit means for smoothing the fluctuating DC voltage and for applying the smoothed DC voltage to said circuit means; and first voltage boost means coupled to said means for receiving for deriving from a load current through said means for receiving a boost voltage and for applying the boost voltage to said capacitor means, said boost means including a transformer coupled to said means for receiving and said capacitor means for boosting the smoothed voltage at a region near the zero crossing of said low frequency AC signal.

18. The circuit of claim 17 further including second voltage boost means coupled to said capacitor means and to said circuit means for deriving from said circuit means a second boost voltage for altering the smoothed voltage at a region near the peaks of said AC signal to produce a relatively smoother DC voltage than that produced by said first means.

* * * * *